United States Patent
Liu et al.

(10) Patent No.: US 11,606,254 B2
(45) Date of Patent: Mar. 14, 2023

(54) AUTOMATIC CONFIGURING OF VLAN AND OVERLAY LOGICAL SWITCHES FOR CONTAINER SECONDARY INTERFACES

(71) Applicant: VMware, Inc., Palo Alto, CA (US)

(72) Inventors: Danting Liu, Beijing (CN); Jianjun Shen, Redwood City, CA (US); Wenfeng Liu, Beijing (CN); Rui Cao, Beijing (CN); Ran Gu, Beijing (CN); Donghai Han, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/389,305

(22) Filed: Jul. 29, 2021

(65) Prior Publication Data
US 2022/0400053 A1    Dec. 15, 2022

(30) Foreign Application Priority Data
Jun. 11, 2021    (WO) ................ PCT/CN2021/099722

(51) Int. Cl.
*H04L 41/08* (2022.01)
*H04L 12/46* (2006.01)

(52) U.S. Cl.
CPC ...... *H04L 41/0876* (2013.01); *H04L 12/4641* (2013.01)

(58) Field of Classification Search
None
See application file for complete search history.

(56) References Cited

U.S. PATENT DOCUMENTS

| | | |
|---|---|---|
| 8,627,442 B2 | 1/2014 | Ji et al. |
| 8,683,560 B1 | 3/2014 | Brooker et al. |
| 9,152,803 B2 | 10/2015 | Biswas et al. |
| 9,225,638 B2 | 12/2015 | Jain et al. |
| 9,258,312 B1 | 2/2016 | O'Neill et al. |
| 9,531,590 B2 | 12/2016 | Jain et al. |

(Continued)

FOREIGN PATENT DOCUMENTS

| | | |
|---|---|---|
| AU | 2004227600 B2 | 5/2009 |
| CA | 3107455 A1 | 2/2020 |

(Continued)

OTHER PUBLICATIONS

Red Hat—"OpenShift Container Platform 4.6"—Mar. 3, 2021 (Year: 2021).*

(Continued)

*Primary Examiner* — Younes Naji
(74) *Attorney, Agent, or Firm* — Adeli LLP

(57) ABSTRACT

The method of some embodiments allocates a secondary network interface for a pod, which has a primary network interface, in a container network operating on an underlying logical network. The method receives an ND that designates a network segment. The method receives the pod, wherein the pod includes an identifier of the ND. The method then creates a secondary network interface for the pod and connects the secondary network interface to the network segment. In some embodiments, the pods include multiple ND identifiers that each identify a network segment. The method of such embodiments creates multiple secondary network interfaces and attaches the multiple network segments to the multiple secondary network interfaces.

12 Claims, 7 Drawing Sheets

(56) References Cited

U.S. PATENT DOCUMENTS

| | | |
|---|---|---|
| 9,536,077 B2 | 1/2017 | Bignon et al. |
| 9,594,546 B1 | 3/2017 | Todd et al. |
| 9,674,275 B1 | 6/2017 | Engers et al. |
| 9,755,898 B2 | 9/2017 | Jain et al. |
| 9,774,537 B2 | 9/2017 | Jain et al. |
| 9,825,810 B2 | 11/2017 | Jain et al. |
| 9,935,827 B2 | 4/2018 | Jain et al. |
| 9,979,641 B2 | 5/2018 | Jain et al. |
| 10,095,669 B1 | 10/2018 | Karppanen |
| 10,122,735 B1 | 11/2018 | Wohlgemuth |
| 10,129,077 B2 | 11/2018 | Jain et al. |
| 10,135,737 B2 | 11/2018 | Jain et al. |
| 10,193,977 B2 | 1/2019 | Ke et al. |
| 10,205,701 B1 | 2/2019 | Voss et al. |
| 10,225,137 B2 | 3/2019 | Jain et al. |
| 10,257,095 B2 | 4/2019 | Jain et al. |
| 10,270,796 B1 | 4/2019 | Veeraswamy et al. |
| 10,320,679 B2 | 6/2019 | Jain et al. |
| 10,341,233 B2 | 7/2019 | Jain et al. |
| 10,496,605 B2 | 12/2019 | Melnik et al. |
| 10,516,568 B2 | 12/2019 | Jain et al. |
| 10,594,743 B2 | 3/2020 | Hong et al. |
| 10,609,091 B2 | 3/2020 | Hong et al. |
| 10,613,888 B1 | 4/2020 | Mentz et al. |
| 10,628,144 B2 | 4/2020 | Myneni et al. |
| 10,652,143 B2 | 5/2020 | Ravinoothala et al. |
| 10,693,782 B2 | 6/2020 | Jain et al. |
| 10,708,368 B1 | 7/2020 | Young et al. |
| 10,725,836 B2 | 7/2020 | Savenkov et al. |
| 10,795,909 B1 | 10/2020 | Bond et al. |
| 10,812,337 B2 | 10/2020 | Vaidya et al. |
| 10,841,226 B2 | 11/2020 | Mariappan et al. |
| 10,942,788 B2 | 3/2021 | Palavalli et al. |
| 10,944,691 B1 | 3/2021 | Raut et al. |
| 10,951,661 B1 | 3/2021 | Medan et al. |
| 10,972,341 B2 | 4/2021 | Mudigonda |
| 10,972,386 B2 | 4/2021 | Mackie et al. |
| 11,074,091 B1 | 7/2021 | Nayakbomman et al. |
| 11,086,700 B2 | 8/2021 | Myneni et al. |
| 11,159,366 B1 | 10/2021 | Gawade et al. |
| 11,190,491 B1 | 11/2021 | Kaciulis et al. |
| 11,194,483 B1 | 12/2021 | Dontu et al. |
| 11,277,309 B2 | 3/2022 | Vaidya et al. |
| 11,316,822 B1 | 4/2022 | Gawade et al. |
| 2004/0098154 A1 | 5/2004 | McCarthy |
| 2005/0129019 A1 | 6/2005 | Cheriton |
| 2010/0177674 A1 | 7/2010 | Aggarwal |
| 2010/0211815 A1 | 8/2010 | Mankovskii et al. |
| 2010/0246545 A1 | 9/2010 | Berzin |
| 2010/0293378 A1 | 11/2010 | Xiao et al. |
| 2011/0194494 A1 | 8/2011 | Aso et al. |
| 2012/0150912 A1 | 6/2012 | Ripberger |
| 2012/0304275 A1 | 11/2012 | Ji et al. |
| 2013/0018994 A1 | 1/2013 | Flavel et al. |
| 2013/0019314 A1 | 1/2013 | Ji et al. |
| 2013/0125230 A1 | 5/2013 | Koponen et al. |
| 2013/0174168 A1 | 7/2013 | Abuelsaad et al. |
| 2013/0283339 A1 | 10/2013 | Biswas et al. |
| 2014/0129690 A1 | 5/2014 | Jaisinghani et al. |
| 2014/0164897 A1 | 6/2014 | Yucel et al. |
| 2014/0223556 A1 | 8/2014 | Bignon et al. |
| 2014/0237100 A1 | 8/2014 | Cohn et al. |
| 2014/0258479 A1 | 9/2014 | Tenginakai et al. |
| 2015/0063166 A1 | 3/2015 | Sif et al. |
| 2015/0081767 A1 | 3/2015 | Evens |
| 2015/0222598 A1 | 8/2015 | Koponen et al. |
| 2015/0249574 A1 | 9/2015 | Zhang |
| 2015/0263899 A1 | 9/2015 | Tubaltsev et al. |
| 2015/0263946 A1 | 9/2015 | Tubaltsev et al. |
| 2015/0317169 A1 | 11/2015 | Sinha et al. |
| 2015/0348044 A1 | 12/2015 | Smith |
| 2015/0379281 A1 | 12/2015 | Feroz et al. |
| 2016/0036860 A1 | 2/2016 | King et al. |
| 2016/0080422 A1 | 3/2016 | Belgodere et al. |
| 2016/0094454 A1 | 3/2016 | Jain et al. |
| 2016/0094457 A1 | 3/2016 | Jain et al. |
| 2016/0094661 A1 | 3/2016 | Jain et al. |
| 2016/0217301 A1 | 7/2016 | Watanabe et al. |
| 2016/0241436 A1 | 8/2016 | Fourie et al. |
| 2016/0294612 A1 | 10/2016 | Ravinoothala et al. |
| 2016/0335129 A1 | 11/2016 | Behera et al. |
| 2016/0337334 A1 | 11/2016 | Murr |
| 2017/0005923 A1 | 1/2017 | Babakian |
| 2017/0005986 A1 | 1/2017 | Bansal et al. |
| 2017/0031956 A1 | 2/2017 | Burk et al. |
| 2017/0063632 A1 | 3/2017 | Goliya et al. |
| 2017/0063782 A1 | 3/2017 | Jain et al. |
| 2017/0085561 A1 | 3/2017 | Han et al. |
| 2017/0171144 A1 | 6/2017 | Sagiraju et al. |
| 2017/0177394 A1 | 6/2017 | Barzik et al. |
| 2017/0195210 A1 | 7/2017 | Jacob et al. |
| 2017/0206034 A1 | 7/2017 | Fetik |
| 2017/0207963 A1 | 7/2017 | Mehta et al. |
| 2017/0286698 A1 | 10/2017 | Shetty et al. |
| 2017/0317954 A1 | 11/2017 | Masurekar et al. |
| 2017/0332307 A1 | 11/2017 | Pan |
| 2017/0353351 A1 | 12/2017 | Cheng et al. |
| 2017/0366416 A1 | 12/2017 | Beecham et al. |
| 2017/0374106 A1 | 12/2017 | Hamou et al. |
| 2018/0063194 A1 | 3/2018 | Vaidya et al. |
| 2018/0083835 A1 | 3/2018 | Cole et al. |
| 2018/0089299 A1 | 3/2018 | Collins et al. |
| 2018/0123943 A1 | 5/2018 | Lee et al. |
| 2018/0131675 A1 | 5/2018 | Sengupta et al. |
| 2018/0167453 A1 | 6/2018 | Luo |
| 2018/0167487 A1 | 6/2018 | Vyas et al. |
| 2018/0183757 A1 | 6/2018 | Gunda et al. |
| 2018/0205605 A1 | 7/2018 | Mittal et al. |
| 2018/0248827 A1 | 8/2018 | Scharber et al. |
| 2018/0262424 A1 | 9/2018 | Roeland et al. |
| 2018/0287996 A1 | 10/2018 | Tripathy et al. |
| 2018/0295036 A1 | 10/2018 | Krishnamurthy et al. |
| 2018/0331885 A1 | 11/2018 | Raymond et al. |
| 2018/0359323 A1 | 12/2018 | Madden |
| 2019/0036868 A1 | 1/2019 | Chandrashekhar et al. |
| 2019/0042518 A1 | 2/2019 | Marolia et al. |
| 2019/0079751 A1 | 3/2019 | Foskett et al. |
| 2019/0102280 A1 | 4/2019 | Caldato et al. |
| 2019/0103992 A1 | 4/2019 | Cidon et al. |
| 2019/0132220 A1 | 5/2019 | Boutros et al. |
| 2019/0132221 A1 | 5/2019 | Boutros et al. |
| 2019/0140895 A1 | 5/2019 | Ennis, Jr. et al. |
| 2019/0140921 A1 | 5/2019 | Xu et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0171650 A1 | 6/2019 | Botev et al. |
| 2019/0229987 A1 | 7/2019 | Shelke et al. |
| 2019/0238363 A1 | 8/2019 | Boutros et al. |
| 2019/0238364 A1 | 8/2019 | Boutros et al. |
| 2019/0273683 A1 | 9/2019 | Jiang et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0356693 A1 | 11/2019 | Cahana et al. |
| 2019/0384645 A1 | 12/2019 | Palavalli et al. |
| 2019/0386877 A1 | 12/2019 | Vaidya et al. |
| 2020/0065080 A1 | 2/2020 | Myneni et al. |
| 2020/0065166 A1 | 2/2020 | Myneni et al. |
| 2020/0073692 A1 | 3/2020 | Rao et al. |
| 2020/0076684 A1 | 3/2020 | Naveen et al. |
| 2020/0076685 A1 | 3/2020 | Vaidya et al. |
| 2020/0076734 A1 | 3/2020 | Naveen et al. |
| 2020/0092275 A1 | 3/2020 | Seed et al. |
| 2020/0112504 A1 | 4/2020 | Osman |
| 2020/0213366 A1 | 7/2020 | Hong et al. |
| 2020/0250009 A1 | 8/2020 | Jaeger et al. |
| 2020/0250074 A1 | 8/2020 | Zhang et al. |
| 2020/0314006 A1 | 10/2020 | Mackie et al. |
| 2020/0344120 A1 | 10/2020 | Pianigiani et al. |
| 2020/0366558 A1 | 11/2020 | Vaidya et al. |
| 2020/0382556 A1 | 12/2020 | Woolward et al. |
| 2020/0401457 A1 | 12/2020 | Singhal et al. |
| 2020/0409671 A1 | 12/2020 | Mazurskiy |

(56) References Cited

U.S. PATENT DOCUMENTS

| | | | |
|---|---|---|---|
| 2021/0004292 A1 | 1/2021 | Zlotnick | |
| 2021/0165695 A1 | 6/2021 | Palavalli et al. | |
| 2021/0200814 A1 | 7/2021 | Tai et al. | |
| 2021/0243164 A1 | 8/2021 | Murray et al. | |
| 2021/0311803 A1 | 10/2021 | Zhou et al. | |
| 2021/0314190 A1 | 10/2021 | Liu et al. | |
| 2021/0314239 A1 | 10/2021 | Shen et al. | |
| 2021/0314240 A1 | 10/2021 | Liu et al. | |
| 2021/0314300 A1 | 10/2021 | Shen et al. | |
| 2021/0314361 A1 | 10/2021 | Zhou et al. | |
| 2021/0314388 A1 | 10/2021 | Zhou et al. | |
| 2021/0328858 A1* | 10/2021 | Asveren | H04L 61/5007 |
| 2021/0349765 A1 | 11/2021 | Zhou et al. | |
| 2021/0365308 A1 | 11/2021 | Myneni et al. | |
| 2021/0397466 A1 | 12/2021 | McKee et al. | |
| 2022/0035651 A1 | 2/2022 | Maurya et al. | |
| 2022/0038311 A1 | 2/2022 | Shen et al. | |
| 2022/0070250 A1 | 3/2022 | Baid et al. | |
| 2022/0182439 A1 | 6/2022 | Zhou et al. | |
| 2022/0200865 A1 | 6/2022 | Vaidya et al. | |
| 2022/0278926 A1* | 9/2022 | Sharma | H04L 45/64 |

FOREIGN PATENT DOCUMENTS

| | | | | |
|---|---|---|---|---|
| CN | 106789367 A | | 5/2017 | |
| CN | 107947961 A | | 4/2018 | |
| CN | 108809722 A | | 11/2018 | |
| CN | 110531987 A | | 12/2019 | |
| CN | 110611588 A | | 12/2019 | |
| CN | 111327640 A | * | 6/2020 | H04L 41/0803 |
| CN | 111371627 A | * | 7/2020 | H04L 41/0803 |
| CN | 111865643 A | | 10/2020 | |
| CN | 113141386 A | | 7/2021 | |
| EP | 2464151 A2 | | 6/2012 | |
| EP | 2464152 A2 | | 6/2012 | |
| WO | 2011159842 A2 | | 12/2011 | |
| WO | 2016160523 A1 | | 10/2016 | |
| WO | 2018044352 A1 | | 3/2018 | |
| WO | 2019241086 A1 | | 12/2019 | |
| WO | 2020041073 A1 | | 2/2020 | |
| WO | 2021196080 A1 | | 10/2021 | |
| WO | 2022026028 A1 | | 2/2022 | |

OTHER PUBLICATIONS

Advance Networking Feature in Kubernetes and Container Bare Metal—Dec. 2018 (Year: 2018).*

Attaching a Pod to an additional network—Multiple networks _ OpenShift Container Platform 4.6 (Year: 2021).*

Abhashkumar, Anubhavnidhi, et al., "Supporting Diverse Dynamic Intent-based Policies Using Janus," CoNEXT 17, Dec. 12-15, 2017, 14 pages, ACM, Incheon, KR.

Abwnawar, Nasser, "A Policy-Based Management Approach to Security in Cloud Systems," Feb. 2020, 184 pages, De Monfort University, Leicester, UK.

Non-published commonly owned U.S. Appl. No. 17/112,689, filed Dec. 4, 2020, 63 pages, VMware, Inc.

Non-published Commonly Owned U.S. Appl. No. 17/333,136, filed May 28, 2021, 32 pages, VMware, Inc.

Non-published Commonly Owned U.S. Appl. No. 17/692,634, filed Mar. 11, 2022, 42 pages, VMware, Inc.

Author Unknown, "E-Security Begins with Sound Security Policies," Jun. 14, 2001, 23 pages, Symantec Corporation.

Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.

Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.

Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.

Rouse, Margaret, "What is SDDC (software-defined data center)?—Definition from WhatIs.com," Mar. 2017, 5 pages, TechTarget.com.

Sayfan, Gigi, "Mastering Kubernetes: Automating container deployment and management," May 2017, 426 pages, Packt Publishing, Birmingham, UK.

Wodicka, Brent, "A Developer's Guide to Container Orchestration, Kubernetes, & AKS," Mar. 19, 2019, 5 pages, AIS, Reston, VA, USA.

Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.

Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.

* cited by examiner

AUTOMATIC CONFIGURING OF VLAN AND OVERLAY LOGICAL SWITCHES FOR CONTAINER SECONDARY INTERFACES

Container networks (e.g., Kubernetes) are an increasingly popular type of network system for deploying applications in datacenters. The pods of containers produced by such a system can be deployed more rapidly than virtual machines (VMs) or physical computers. Therefore, a deployment can be scaled up or down to meet demand more rapidly than is typical for VMs or physical computers. In addition, a set of containers in a container network system has less overhead and can generally perform the same tasks faster than a corresponding VM would.

In present container based network systems (e.g., Kubernetes) pods are instantiated with an automatically configured primary interface for communicating with outside devices (e.g., physical or virtual machines or containers separate from the pod). However, existing container based network systems do not have a convenient way of adding secondary interfaces to a pod. For some container network based applications, multiple interfaces for a single pod are necessary. However, in the existing art, there is no way to automatically add additional interfaces to a pod. Therefore, there is a need in the art for an automated way to add secondary interfaces to a pod.

BRIEF SUMMARY

The method of some embodiments allocates a secondary network interface for a pod, which has a primary network interface, in a container network operating on an underlying logical network. The method receives a network attachment definition (ND) that designates a network segment. The method receives the pod, wherein the pod includes an identifier of the ND. The method then creates a secondary network interface for the pod and connects the secondary network interface to the network segment. In some embodiments, the pods include multiple ND identifiers that each identify a network segment. The method of such embodiments creates multiple secondary network interfaces and attaches the multiple network segments to the multiple secondary network interfaces.

Designating the network segment includes identifying a network segment created on the logical network before the ND is received in some embodiments. The method may further include directing the logical network to modify the network segment according to a set of attributes in the received ND.

Designating the network segment includes providing a set of attributes of the network segment in some embodiments. The method of such embodiments further includes directing the logical network to create the network segment according to the received set of attributes. The set of attributes may include a network type, where the network type is a VLAN-backed network segment or an overlay-backed network segment.

In some embodiments in which a pod includes multiple ND identifiers, for one set of NDs, each ND designates a network segment by identifying a network segment created on the logical network before the ND is received while for another set of NDs, each ND designates a network segment by providing a set of attributes of the network segment. The method of such embodiments further includes directing the logical network to create the second set of network segments according to the received set of attributes.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
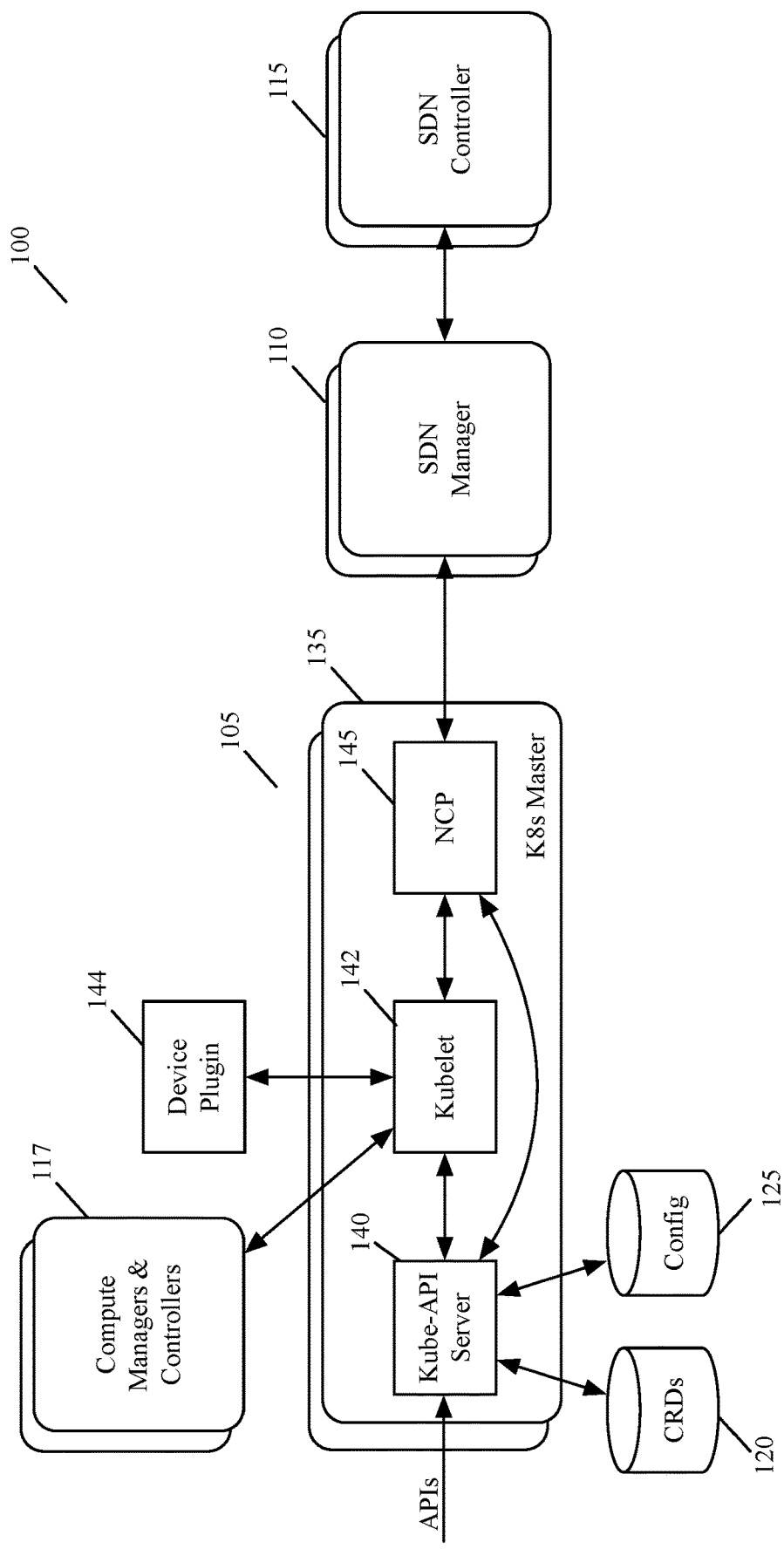
FIG. 1 illustrates an example of a control system of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

The method of some embodiments allocates a secondary network interface for a pod, which has a primary network interface, in a container network operating on an underlying logical network. The method receives an ND that designates a network segment. The method receives the pod, wherein the pod includes an identifier of the ND. The method then creates a secondary network interface for the pod and connects the secondary network interface to the network segment. In some embodiments, the pods include multiple ND identifiers that each identify a network segment. The method of such embodiments creates multiple secondary network interfaces and attaches the multiple network segments to the multiple secondary network interfaces.

Designating the network segment includes identifying a network segment created on the logical network before the ND is received in some embodiments. The method may further include directing the logical network to modify the network segment according to a set of attributes in the received ND.

Designating the network segment includes providing a set of attributes of the network segment in some embodiments. The method of such embodiments further includes directing the logical network to create the network segment according to the received set of attributes. The set of attributes may include a network type, where the network type is a VLAN-backed network segment or an overlay-backed network segment.

In some embodiments in which a pod includes multiple ND identifiers, for one set of NDs, each ND designates a network segment by identifying a network segment created on the logical network before the ND is received while for another set of NDs, each ND designates a network segment by providing a set of attributes of the network segment. The method of such embodiments further includes directing the logical network to create the second set of network segments according to the received set of attributes.

Many of the embodiments described herein are described with relation to a Kubernetes system, sometimes abbreviated "Kubes" or "K8s." However, one of ordinary skill in the art will understand that this is merely one example of a container network system that embodies the inventions described herein and that other embodiments may apply to other container network systems.

In the Kubernetes system, a container in a container network is a lightweight executable image that contains software and all of its dependencies (e.g., libraries, etc.). Containers are executed in pods. A pod is the smallest deployable unit a user can create in a Kubernetes system. A pod may have one or more containers running in it. The containers of a pod may use shared storage and network resources. The pod includes a specification for how to run the containers. A pod's contents in some embodiments are always stored together and executed together. A pod provides an application-specific logical host. The logical host contains one or more application containers. One of the potential shared resources of a pod is a secondary interface.

In addition to the templates and code that is supplied by the original programmers of the Kubernetes system, the system allows a user to create customized resources. The network control system of some embodiments processes one or more Custom Resource Definitions (CRDs) that define attributes of custom-specified network resources. The CRDs define extensions to the Kubernetes networking requirements. Some embodiments use the following CRDs: network-attachment-definition (NDs), Virtual Network Interfaces (VIF) CRDs, Virtual Network CRDs, Endpoint Group CRDs, security CRDs, Virtual Service Object (VSO) CRDs, and Load Balancer CRDs.

FIG. 1 illustrates an example of a control system 100 of some embodiments of the invention. This system 100 processes APIs that use the Kubernetes-based declarative model to describe the desired state of (1) the machines to deploy, and (2) the connectivity, security and service operations that are to be performed for the deployed machines (e.g., private and public IP addresses connectivity, load balancing, security policies, etc.). To process these APIs, the control system 100 uses one or more CRDs to define some of the resources referenced in the APIs. The system 100 performs automated processes to deploy a logical network that connects the deployed machines and segregates these machines from other machines in the datacenter set. The machines are connected to the deployed logical network of a virtual private cloud (VPC) in some embodiments.

As shown, the control system 100 includes an API processing cluster 105, a software defined network (SDN) manager cluster 110, an SDN controller cluster 115, and compute managers and controllers 117. The API processing cluster 105 includes two or more API processing nodes 135, with each node comprising an API processing server 140, a Kubelet 142 node agent, and a network controller plugin (NCP) 145. The API processing server 140 receives intent-based API calls and parses these calls. In some embodiments, the received API calls are in a declarative, hierarchical Kubernetes format, and may contain multiple different requests.

The API processing server 140 parses each received intent-based API request into one or more individual requests. When the requests relate to the deployment of machines, the API server provides these requests directly to compute managers and controllers 117, or indirectly provide these requests to the compute managers and controllers 117 through the Kubelet 142 and/or the NCP 145 running on the Kubernetes master node 135. The compute managers and controllers 117 then deploy VMs and/or Pods on host computers in the availability zone.

The kubelet 142 node agent on a node can register the node with the API server 140 using one of: the hostname; a flag to override the hostname; or specific logic for a cloud provider. The kubelet 142 receives PodSpecs, YAML (a data serialization language) or JavaScript Object Notation (JSON) formatted objects that each describe a pod. The kubelet 142 uses a set of PodSpecs to create (e.g., using the compute managers and controllers 117) the pods that are provided by various mechanism elements (e.g., from the API server 140) and ensures that the containers described in those PodSpecs are running and healthy.

The API calls can also include requests that require network elements to be deployed. In some embodiments, these requests explicitly identify the network elements to deploy, while in other embodiments the requests can also implicitly identify these network elements by requesting the deployment of compute constructs (e.g., compute clusters, containers, etc.) for which network elements have to be defined by default. As further described below, the control system 100 uses the NCP 145 to identify the network elements that need to be deployed, and to direct the deployment of these network elements.

In some embodiments, the API calls refer to extended resources that are not defined per se by the baseline Kubernetes system. For these references, the API processing server 140 uses one or more CRDs 120 to interpret the references in the API calls to the extended resources. As mentioned above, the CRDs in some embodiments include the NDs, VIF, Virtual Network, Endpoint Group, Security Policy, Admin Policy, and Load Balancer and VSO CRDs. In some embodiments, the CRDs are provided to the API processing server 140 in one stream with the API calls.

NCP 145 is the interface between the API server 140 and the SDN manager cluster 110 that manages the network elements that serve as the forwarding elements (e.g., switches, routers, bridges, etc.) and service elements (e.g., firewalls, load balancers, etc.) in an availability zone. The SDN manager cluster 110 directs the SDN controller cluster 115 to configure the network elements to implement the desired forwarding elements and/or service elements (e.g., logical forwarding elements and logical service elements) of one or more logical networks. As further described below, the SDN controller cluster 115 interacts with local controllers on host computers and edge gateways to configure the network elements in some embodiments.

In some embodiments, NCP 145 registers for event notifications with the API server 140, e.g., sets up a long-pull session with the API server to receive all CRUD (Create, Read, Update, and Delete) events for various CRDs that are defined for networking. In some embodiments, the API server 140 is a Kubernetes master VM, and the NCP 145 runs in this VM as a Pod. NCP 145 in some embodiments collects realization data from the SDN resources for the CRDs and provides this realization data as it relates to the CRD status. In some embodiments, the NCP 145 communicates directly with the API server 140 and/or through the Kubelet 142.

In some embodiments, NCP 145 processes the parsed API requests relating to NDs, VIFs, virtual networks, load balancers, endpoint groups, security policies, and VSOs, to direct the SDN manager cluster 110 to implement (1) the NDs to designate network segments for use with secondary interfaces of pods, (2) the VIFs needed to connect VMs and Pods to forwarding elements on host computers, (3) the virtual networks to implement different segments of a logical network of the VPC, (4) the load balancers to distribute the traffic load to endpoint machines, (5) the firewalls to implement security and admin policies, and (6) the exposed ports to access services provided by a set of machines in the VPC to machines outside and inside of the VPC.

The API server 140 provides the CRDs 120 that have been defined for these extended network constructs to the NCP 145 for it to process the APIs that refer to the corresponding network constructs (e.g., network segments). The API server 140 also provides configuration data from the configuration storage 125 to the NCP 145. The configuration data in some embodiments includes parameters that adjust the pre-defined template rules that the NCP 145 follows to perform its automated processes. In some embodiments, the configuration data includes a configuration map. The configuration map of some embodiments may be generated from one or more directories, files, or literal values. The configuration map (or "ConfigMap") is discussed further with respect to the device plugin 144, below.

The NCP 145 performs these automated processes to execute the received API requests in order to direct the SDN manager cluster 110 to deploy the network elements for the VPC. For a received API, the control system 100 performs one or more automated processes to identify and deploy one or more network elements that are used to implement the logical network for a VPC. The control system performs these automated processes without an administrator performing any action to direct the identification and deployment of the network elements after an API request is received.

The SDN managers 110 and controllers 115 can be any SDN managers and controllers available today. In some embodiments, these managers and controllers are the NSX-T managers and controllers licensed by VMware Inc. In such embodiments, NCP 145 detects network events by processing the data supplied by its corresponding API server 140, and uses NSX-T APIs to direct the NSX-T manager 110 to deploy and/or modify NSX-T network constructs needed to implement the network state expressed by the API calls. The communication between the NCP and NSX-T manager 110 is an asynchronous communication, in which NCP provides the desired state to NSX-T managers, which then relay the desired state to the NSX-T controllers to compute and disseminate the state asynchronously to the host computer, forwarding elements and service nodes in the availability zone (i.e., to the SDDC set controlled by the controllers 115).

After receiving the APIs from the NCPs 145, the SDN managers 110 in some embodiments direct the SDN controllers 115 to configure the network elements to implement the network state expressed by the API calls. In some embodiments, the SDN controllers serve as the central control plane (CCP) of the control system 100.

In some embodiments, a device plug-in 144 identifies resources available to the pods on a node based on a configuration map of the node. The configuration map in some embodiments is received from the API server 140. In some embodiments, the configuration map is generated from files in the configuration storage 125, from data received by the API server from the NCP and/or from data generated by the SDN manager 110. In some embodiments, the device plug-in receives the configuration map directly from the API server 140. In other embodiments, the device plug-in receives the configuration map through the kubelet 142. The configuration map in some embodiments includes identifiers of pre-created network segments of the logical network.

A network segment, sometimes called a logical switch, logical network segment, or a transport zone, acts in a manner similar to a subnet, e.g., a layer 2 broadcast zone. Individual pods can interface with a network segment and communicate with other pods or devices configured to interface with the network segment. However, one of ordinary skill in the art will understand that a network segment (or logical switch) does not operate as a physical switch connecting devices that are both directly connected to the same switch, but for example as a VPN tunnel or VLAN, allowing pods or devices that are not directly connected to communicate as though they are all connected to a common switch.

Figure 2:
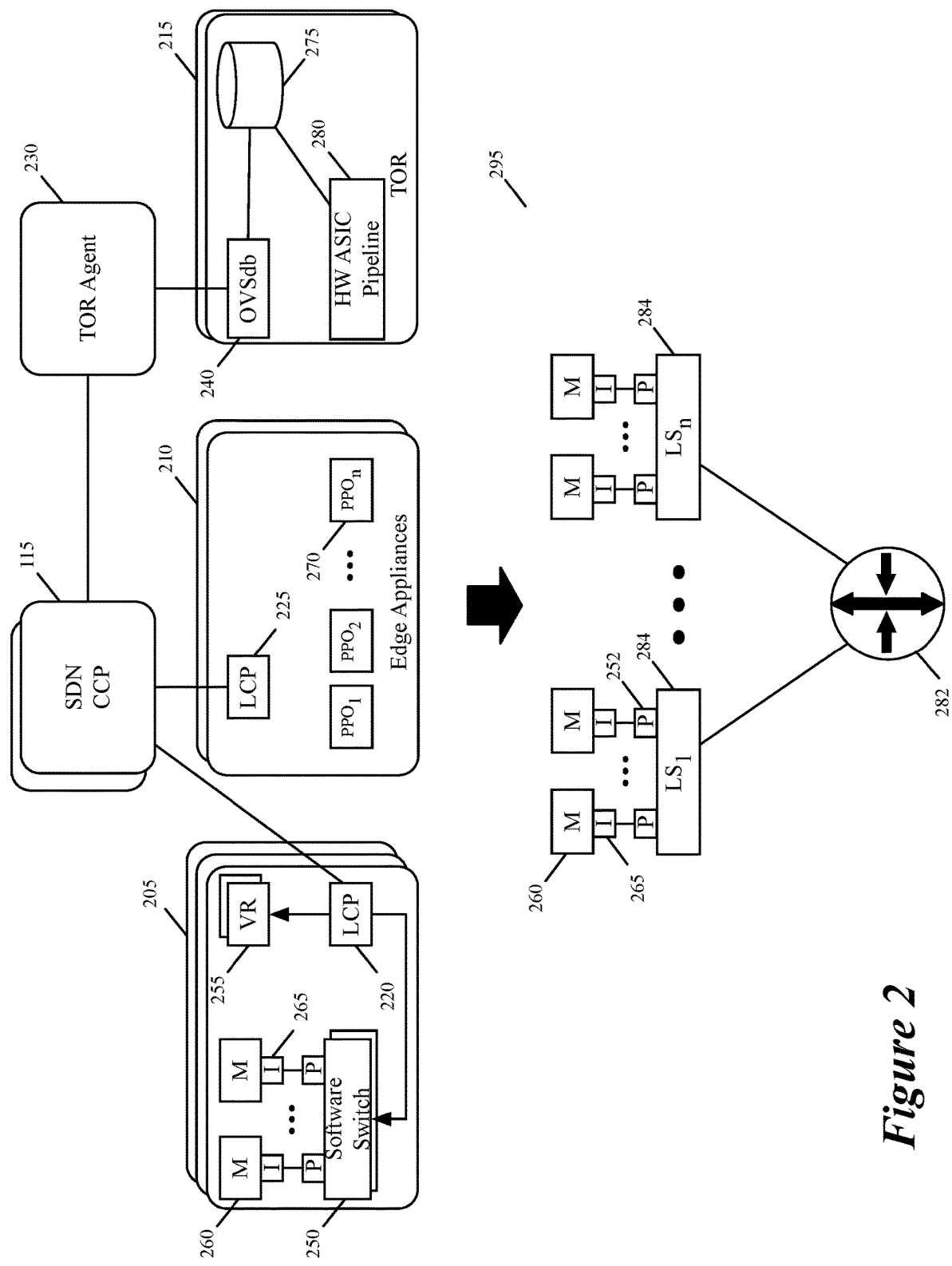
FIG. 2 illustrates an example of a logical network for a virtual private cloud.

FIG. 2 illustrates an example of a logical network for a virtual private cloud. FIG. 2 depicts the SDN controllers 115, acting as the CCP, computing high level configuration data (e.g., port configuration, policies, forwarding tables, service tables, etc.). In such capacity, the SDN controllers 115 push the high-level configuration data to the local control plane (LCP) agents 220 on host computers 205, LCP agents 225 on edge appliances 210 and TOR (top-of-rack) agents 230 of TOR switches 215. The CCP and LCPs configure managed physical forwarding elements (PFEs), e.g., switches, routers, bridges, etc., to implement logical forwarding elements (LFEs). A typical LFE spans multiple PFEs running on multiple physical devices (e.g., computers, etc.).

Based on the received configuration data, the LCP agents 220 on the host computers 205 configure one or more software switches 250 and software routers 255 to implement distributed logical switches, routers, bridges and/or service nodes (e.g., service VMs or hypervisor service engines) of one or more logical networks with the corresponding switches and routers on other host computers 205, edge appliances 210, and TOR switches 215. On the edge appliances, the LCP agents 225 configure packet processing stages 270 of these appliance to implement the logical switches, routers, bridges and/or service nodes of one or more logical networks along with the corresponding switches and routers on other host computers 205, edge appliances 210, and TOR switches 215.

For the TORs 215, the TOR agents 230 configure one or more configuration tables 275 of TOR switches 215 through an OVSdb server 240. The data in the configuration tables is then used to configure the hardware ASIC packet-processing pipelines 280 to perform the desired forwarding operations to implement the desired logical switching, routing, bridging and service operations. U.S. patent application Ser. No. 14/836,802, filed Aug. 26, 2015, now issued as U.S. Pat. No. 10,554,484, U.S. patent application Ser. No. 15/342,921, filed Nov. 3, 2016, now issued as U.S. Pat. No. 10,250,553, U.S. patent application Ser. No. 14/815,839, filed Jul. 31, 2015, now issued as U.S. Pat. No. 9,847,938, and U.S. patent application Ser. No. 13/589,077, filed Aug. 17, 2021, now issued as U.S. Pat. No. 9,178,833 describe CCPs, LCPs and TOR agents in more detail, and are incorporated herein by reference.

After the host computers 205 are configured along with the edge appliances 210 and/or TOR switches 215, they can implement one or more logical networks, with each logical network segregating the machines and network traffic of the entity for which it is deployed from the machines and network traffic of other entities in the same availability zone. FIG. 2 illustrates an example of a logical network 295 that defines a VPC for one entity, such as one corporation in a multi-tenant public datacenter, or one department of one corporation in a private datacenter.

As shown, the logical network 295 includes multiple logical switches 284 with each logical switch connecting different sets of machines and serving as a different network segment. Each logical switch has a port 252 that connects with (i.e., is associated with) a virtual interface 265 of a machine 260. The machines 260 in some embodiments include VMs and Pods, with each Pod having one or more containers. The logical network 295 also includes a logical router 282 that connects the different network segments defined by the different logical switches 284. In some embodiments, the logical router 282 serves as a gateway for the deployed VPC in FIG. 2.

Figure 3:
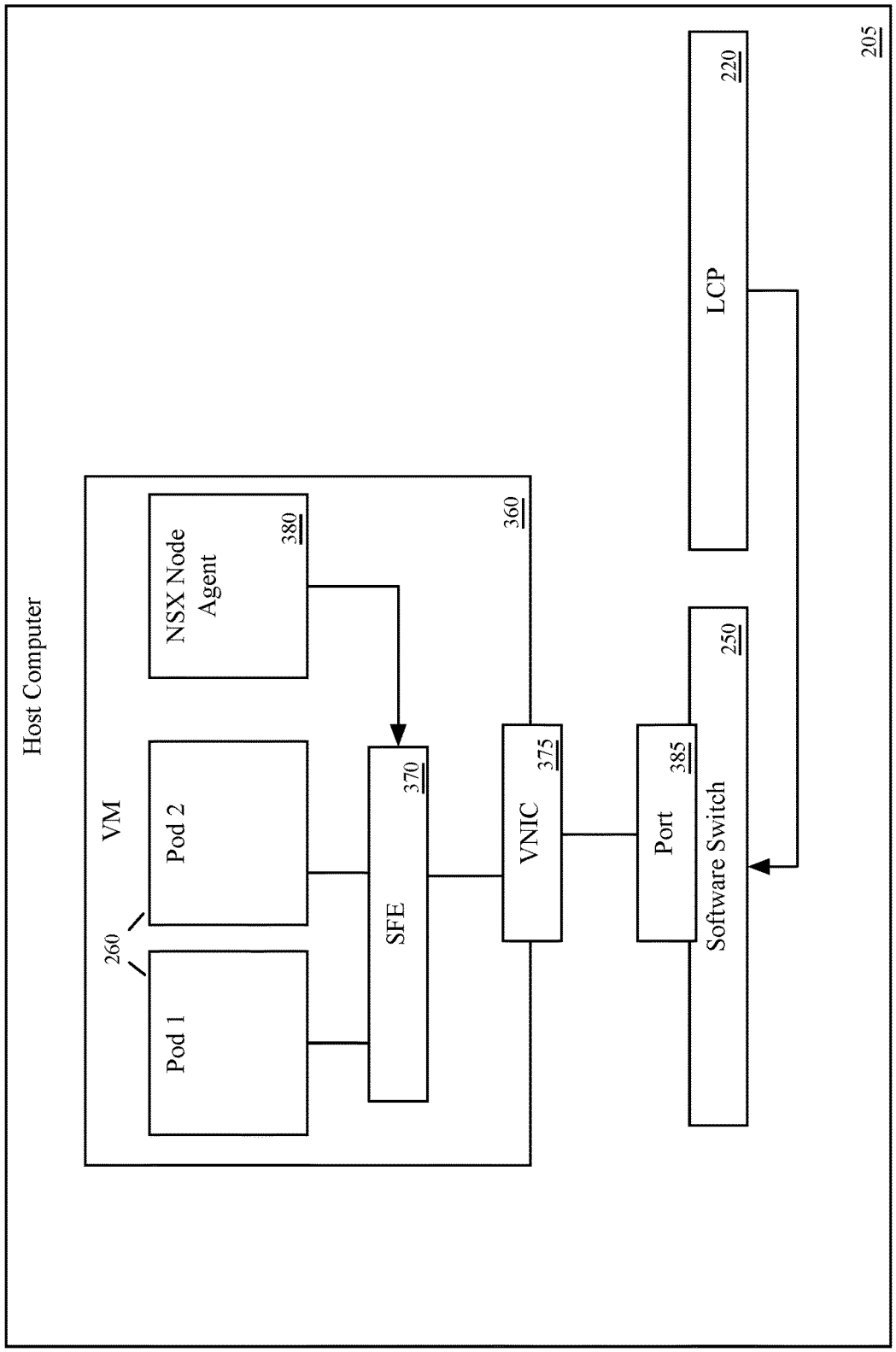
FIG. 3 illustrates pods implemented on VMs of a host computer.

FIG. 3 illustrates pods 260 implemented on VM 360 of a host computer 205. The pods 365 are connected to a software forwarding element (SFE) 370. In some embodiments the SFE 370 is a software switch, a software bridge, or software code that enables the pods to share the virtual network interface card (VNIC) 375 of the VM 360. The connection between the pods 365 and the SFE 370 is initiated by an NSX node agent 380 that performs the functions of an NCP (e.g., as part of a distributed NCP) on the VM 360. The SFE 370 in turn passes communications between the pods 365 and the VNIC 375. The VNIC 375 connects to the port 385 of the software switch 250 that is configured by the LCP 220.

The LCP 220 acts as a local agent of a CCP and, in some embodiments, configures the software switch 250 to implement one or more network segments. As mentioned above, a network segment (or logical switch) allows multiple pods to communicate as though they were on a common switch, but the logical switch itself is implemented by multiple software switches 250 that operate on different host computers, VMs, etc. In some embodiments, a single software switch 250 may implement part of multiple different network segments.

Pods of some embodiments may require multiple interfaces to provide multiple avenues of communication that require different characteristics. For example, in some embodiments a pod may implement part of a telecommunications application, the primary interface of the pod may connect to the main telecommunications network (e.g., to handle one or more of telecommunications control functions, voice data, etc.) while a secondary interface of the pod may provide a high performance link for data traffic. Such a high performance link may be used in some embodiments to connect to a Single Root I/O Virtualization (SR-IOV) system. In some embodiments, the pods are not limited to just the primary and one secondary interfaces, but may have an arbitrary number of interfaces up to the capacity of the logical network to provide network segments.

Figure 4:
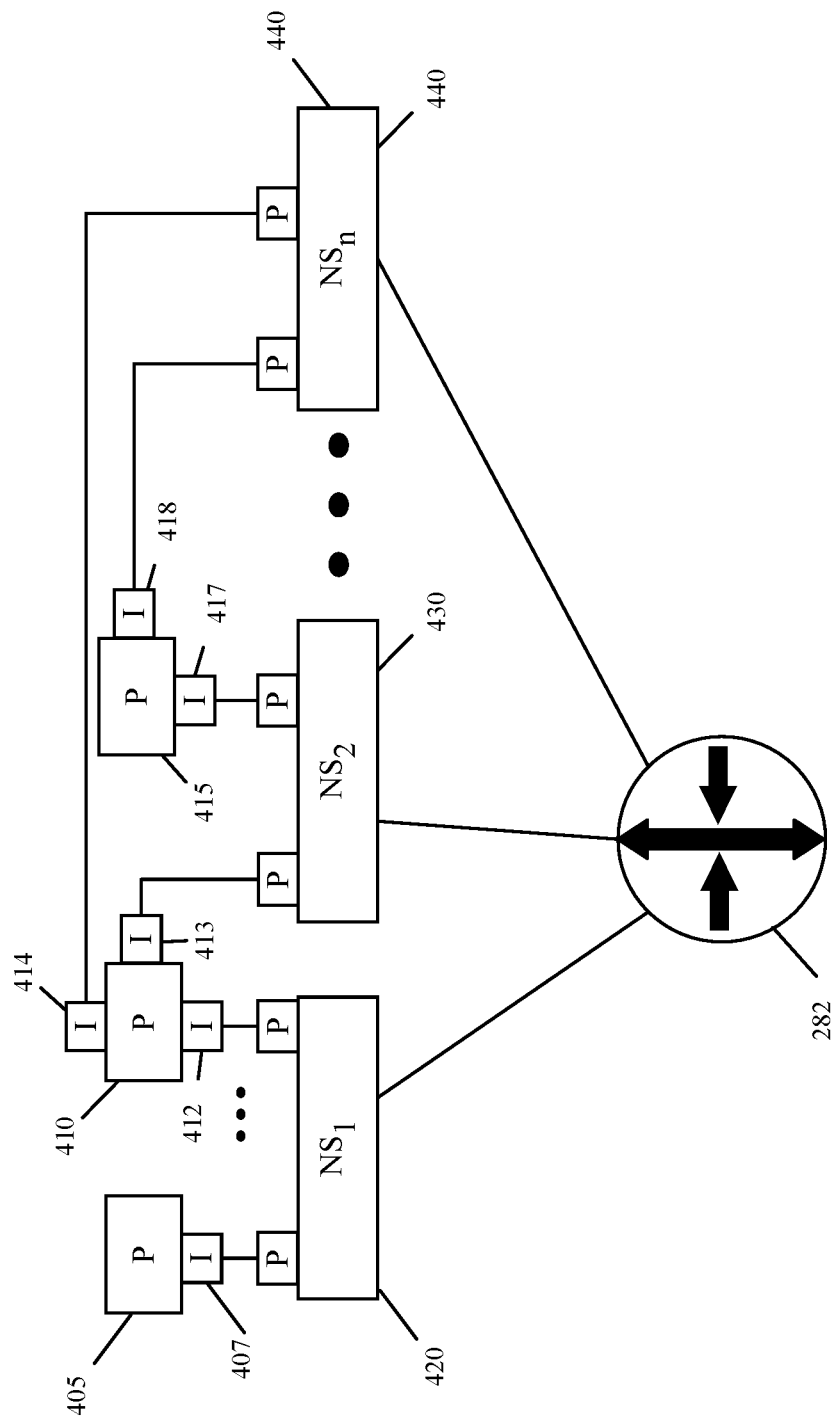
FIG. 4 conceptually illustrates pods with interfaces to one or more network segments.

FIG. 4 conceptually illustrates pods 405, 410, and 415 with interfaces to one or more network segments. Pod 405 is limited to a single interface 407, connecting to network segment 420. The network segment 420 is a logical construct provided by a software switch (not shown) that enables the pod 405 to communicate (e.g., through a VLAN or tunnel in some embodiments) with other pods that interface with the network segment 420 such as pod 410. Pod 410 may be implemented by the same VM as pod 405, or a different VM on the same host, on a VM on a different host, or even directly on a physical computer without a VM. Pod 410 also has a primary interface 412 that connects it to network segment 420. However, pod 410 also has secondary interfaces 413 and 414 connecting pod 410 to network segments 430 and 440, respectively. Pod 415 has primary interface 417 and secondary interface 418 connecting pod 415 to network segments 430 and 440, respectively. Thus pods 410 and 415 can communicate using either network segment 430 or network segment 440. The logical router 282 connects the network segments 420-440.

Figure 5:
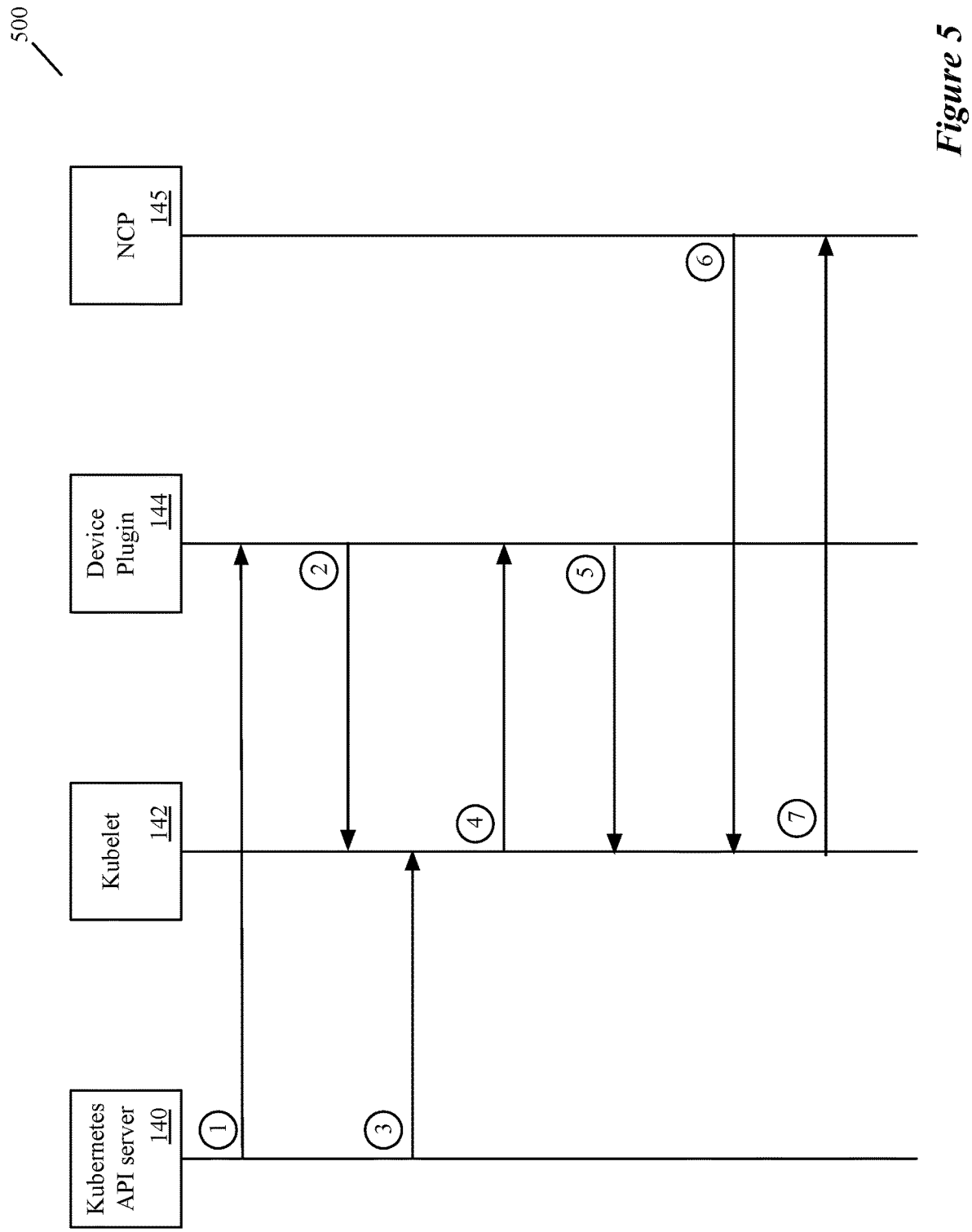
FIG. 5 illustrates a communication sequence of some embodiments for adding a secondary interface to a pod.

Some embodiments provide a sequence for providing resources (including interfaces) to pods, using a device plugin to identify the resources for a kubelet creating the pods. Although the discussion below is limited to a list of network segments, in some embodiments, the device plugin supplies lists of other devices in addition to network segments. FIG. 5 illustrates a communication sequence 500 of some embodiments for adding a secondary interface to a pod. The communication sequence includes several steps, numbered (1) to (7) in the diagram and the following description. The communication sequence 500 begins when the API server 140 (1) sends a list of network segments and, for each network segment, a list of interfaces of the segment to the device plugin 144. The device plugin 144 then determines which interfaces are available and (2) provides the list of available interfaces for each network segment to the kubelet 142. In some embodiments, the device plugin 144 determines available interfaces of a network segment by retrieving an interface list from a specific file location (e.g., sys/class/net) and comparing this interface list with the interface names of the network segment. If an interface name from the interface list matches an interface name of the network segment then the device plugin 144 identifies it as available and that it is a list of such available interfaces that is sent to the kubelet 142 in step (2).

At some point after the kubelet 142 receives the network segment and available interface lists, the API server (3) sends a pod definition to the kubelet 142 that the kubelet 142 will use to create a pod. The pod definition in some embodiments contains a name or other identifier of a secondary network segment to attach the pod to. In some embodiments, the pod includes an internal identifier of the secondary interface to identify the interface to containers of the pod. One of ordinary skill in the art will understand that this internal identifier is a separate and generally distinct identifier from the list of available interfaces identified by the device plugin.

The kubelet 142, in some embodiments, then sends (4) a request for an interface ID of an unallocated interface of the network segment identified in the pod definition, to the device plugin 144. The device plugin 144 then sends (5) an interface ID of an unallocated interface of the identified network segment to the kubelet 142. The device plugin 144 monitors the allocated interface IDs in the embodiment in FIG. 5 however, in other embodiments, the kubelet 142 or the NCP 145 monitors the allocated interface IDs. In some embodiments, when a pod is deleted, whichever element monitors the allocated interface IDs updates the status of the secondary interface(s) allocated to that pod to "unallocated." The NCP 145 queries (6) the kubelet 142 for any pods with secondary interfaces to be attached and receives (7) the interface ID from the kubelet 142. The NCP 145 then creates an interface for the pod and attaches the interface to the identified network segment.

Figure 6:
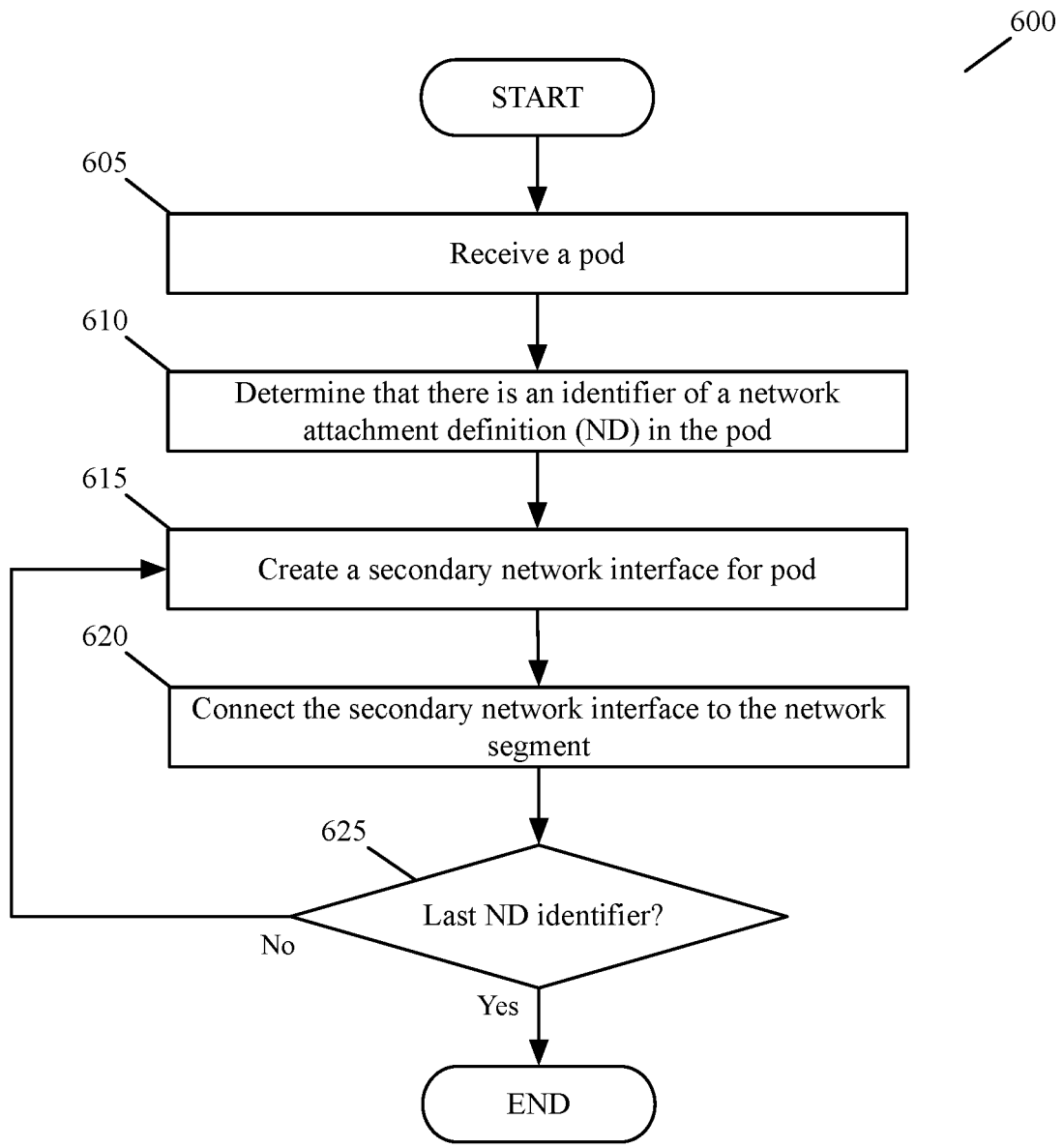
FIG. 6 conceptually illustrates a process of some embodiments for allocating a secondary network interface for a pod with a primary network interface.

Although the communications sequence of FIG. 5 includes a particular set of messages sent in a particular order, in other embodiments, different messages may be sent or the order may be different. For example, in some embodiments, rather than a device plugin tracking the allocated and unallocated interface IDs of a network segment, a kubelet or the NCP tracks which interfaces are allocated and unallocated. In some embodiments, the kubelet receives a pod definition with a network segment identified and creates the pod. Then an NCP determines that the pod includes a network segment identifier, creates a secondary network interface for the pod and connects the secondary interface to the identified network segment. FIG. 6 conceptually illustrates a process 600 of some embodiments for allocating a secondary network interface for a pod with a primary network interface. In some embodiments, the process 600 is performed by an NCP.

The process 600 begins by receiving (at 605) a pod. In some embodiments, receiving a pod means receiving at the NCP a notification that a pod has been created (e.g., by a kubelet). The process 600 determines (at 610) that the pod includes an identifier of a network attachment definition (ND). An ND designates a network segment to attach to a secondary network interface of the pod. In some embodiments, designating a network segment may include identifying, in the ND, a pre-created network segment of a logical network and/or providing attributes in the ND that allow an NCP to command a network manager or controller to dynamically create a network segment in the logical network. When the pod includes an identifier of an ND, the NCP uses that identifier (e.g., in operation 620) to determine which ND designates the network segment to be attached to a secondary interface of the pod.

This is an example of a pod definition that includes an identifier of an ND:
kind: Pod
metadata:
  name: my-pod
  namespace: my-namespace
  annotations:
  k8s.v1.cni.cncf.io/networks: |
    [
      {
        "name": "net-nsx",
        # The name of network attachment CRD
        "interface": "eth1",
        # (optional)The name of interface within the pod.
        "ips": ["1.2.3.4/241"],
        # (optional)IP/prefix_length and mac addresses for the interface, optional.
        "mac": "aa:bb:cc:dd:ee:ff" #(optional)
      },
    ]

In the above example (pod example 1) the pod includes one ND identifier indicating that the pod should have one secondary network interface. However, in some embodiments, pods may include multiple ND identifiers, indicating that the pods should have multiple secondary network interfaces attached to multiple network segments. The identified ND has an identifier called a name, in this example, "net-nsx". However, in some embodiments the ND may have other designations such as a number, code, or other type of identifier. Some examples of NDs that might designate the secondary network segments to attach to the pod of the pod example are provided below.

The process 600 creates (at 615) a secondary interface for the pod. The process 600 then connects (at 620) the secondary network interface created in the pod in operation 615 to the network segment designated by the ND identified in operation 610. The network segment, in some embodiments may be a pre-created network segment. Pre-created network segments are created independently on the logical network without the use of an ND. When a user codes the corresponding ND, the user adds a network identifier, used by the logical network to identify the pre-created network segment, to the ND.

Here is an example of an ND corresponding to the name: net-nsx (the identifier in the pod example above). The ND designates the network segment to be attached when a pod uses the ND identifier "net-nsx". This ND example, and the subsequent dynamically created network segment examples include the name: net-nsx. However, unlike the dynamic network segments, this example of an ND that designates a pre-created network segment includes an identifier of an existing, pre-created network segment:
ND example 1:
apiVersion: k8s.cni.cncf.io/v1
kind: NetworkAttachmentDefinition
metadata:
  name: net-nsx
spec:
  config: '{
  "cniVersion": "0.3.0",
"type": "nsx",
NCP CNI plugin type
"networkID": "071c3745-f982-45ba-91b2-3f9c22af0240",
ID of pre-created NSXT Segment
"ipam": {
  # "ipam" is optional
  "subnet": "192.168.0.0/24",
  # required in "ipam"
  "rangeStart": "192.168.0.2",
  # optional, default value is the secondary IP of subnet
  "rangeEnd": "192.168.0.254",
  # optional, default value is the penultimate IP of subnet
  "gateway": "192.168.0.1"
  # optional, default value is the first IP of subnet
  }
}'

In Example ND 1, the networkID: "071c3745-f982-45ba-91b2-3f9c22af0240" is an ID used by the logical network to identify a pre-created network segment of the logical network. The identified network segment was created (e.g., at the instructions of the user, using the logical network) without the ND and selected by the user (e.g., using the network ID placed in the ND when it was coded) to be used as the network segment for pods using that ND. The NDs of some embodiments with pre-created network segment IDs may also contain additional attributes that modify the pre-created network and/or the interface of the pod on the network segment.

In some embodiments, in addition to or instead of connecting pre-created network segments to pods, the process 600 in operation 620 may connect network segments that are dynamically created according to network attributes provided in an ND. In some embodiments, these network attributes may merely identify the type of network (e.g., VLAN, overlay, MACVLAN, IPVLAN, ENS, etc.) to create or may include additional network attributes. The following are examples of NDs for creating a VLAN-backed network segment and an overlay-backed network segment.
ND example 2:
apiVersion: k8s.cni.cncf.io/v1
kind: NetworkAttachmentDefinition
metadata:
　name: net-nsx
spec:
　　config: '{
　　"cniVersion": "0.3.0",
　　"type": "nsx",
　　# NCP CNI plugin type
　　"networkID": "",
　　# ID of pre-created NSXT Segment
　　"networkType": "vlan",
　　"vlanID": 100,
　　"ipam": {
　　# "ipam" is optional
　　"subnet": "192.168.0.0/24",
　　# required in "ipam"
　　"rangeStart": "192.168.0.2",
　　# optional, default value is the secondary IP of subnet
　　"rangeEnd": "192.168.0.254",
　　# optional, default value is the penultimate IP of subnet
　　"gateway": "192.168.0.1"
　　# optional, default value is the first IP of subnet
　　}
}'
ND example 3:
apiVersion: k8s.cni.cncf.io/v1
kind: NetworkAttachmentDefinition
metadata:
　name: net-nsx
spec:
　　config: '{
　　"cniVersion": "0.3.0",
　　"type": "nsx",
　　# NCP CNI plugin type
　　"networkID": ""
　　# ID of pre-created NSXT Segment
　　"networkType": "overlay",
　　"gatewayID": "081c3745-d982-45bc-91c2-3f9c22af0249",
　　# Optional. ID of NSX-T Gateway to which the created Segment should be connected.
　　"ipam": {
　　# "ipam" is optional
　　"subnet": "192.168.0.0/24",
　　# required in "ipam"
　　"rangeStart": "192.168.0.2",
　　# optional, default value is the secondary IP of subnet
　　"rangeEnd": "192.168.0.254",
　　# optional, default value is the penultimate IP of subnet
　　"gateway": "192.168.0.1"
　　# optional, default value is the first IP of subnet
　　}
}'

In ND example 2, there is no networkID as the ND CRD does not specify a pre-created network segment. In ND example 2, the ND includes a network type (vlan) and a vlanID number (100). In ND example 3, the ND includes a network type (overlay) and an ID of a logical network Gateway to which the created segment should be connected (081c3745-d982-45bc-91c2-3f9c22af0249).

The illustrated embodiment of FIG. 6 handles both pre-created and dynamically created network segments. In some embodiments, the dynamically created network segments are created by the NCP directing the logical network to create the network segments: (1) when the Kubernetes system is being brought online, (2) when the NDs are initially provided to the Kubernetes API (e.g., for NDs coded after the Kubernetes system is started), and/or (3) the first time a pod identifying a particular ND that designates a particular network segment is first received by the NCP. In some embodiments, the NCP provides, to the logical network, default attributes for a dynamic network segment to supplement any attributes supplied by the ND. In some embodiments, these default attributes are supplied in one or more CRDs (that are not network attachment definition CRDs).

As previously mentioned, in some embodiments, a pod may have more than one secondary interface. Therefore, the process 600 determines (at 625) whether the ND identifier was the last ND identifier of the pod. If the ND identifier was not the last one in the pod, the process 600 loops back to operation 615. If the network segment identifier was the last one in the pod, the process 600 ends.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
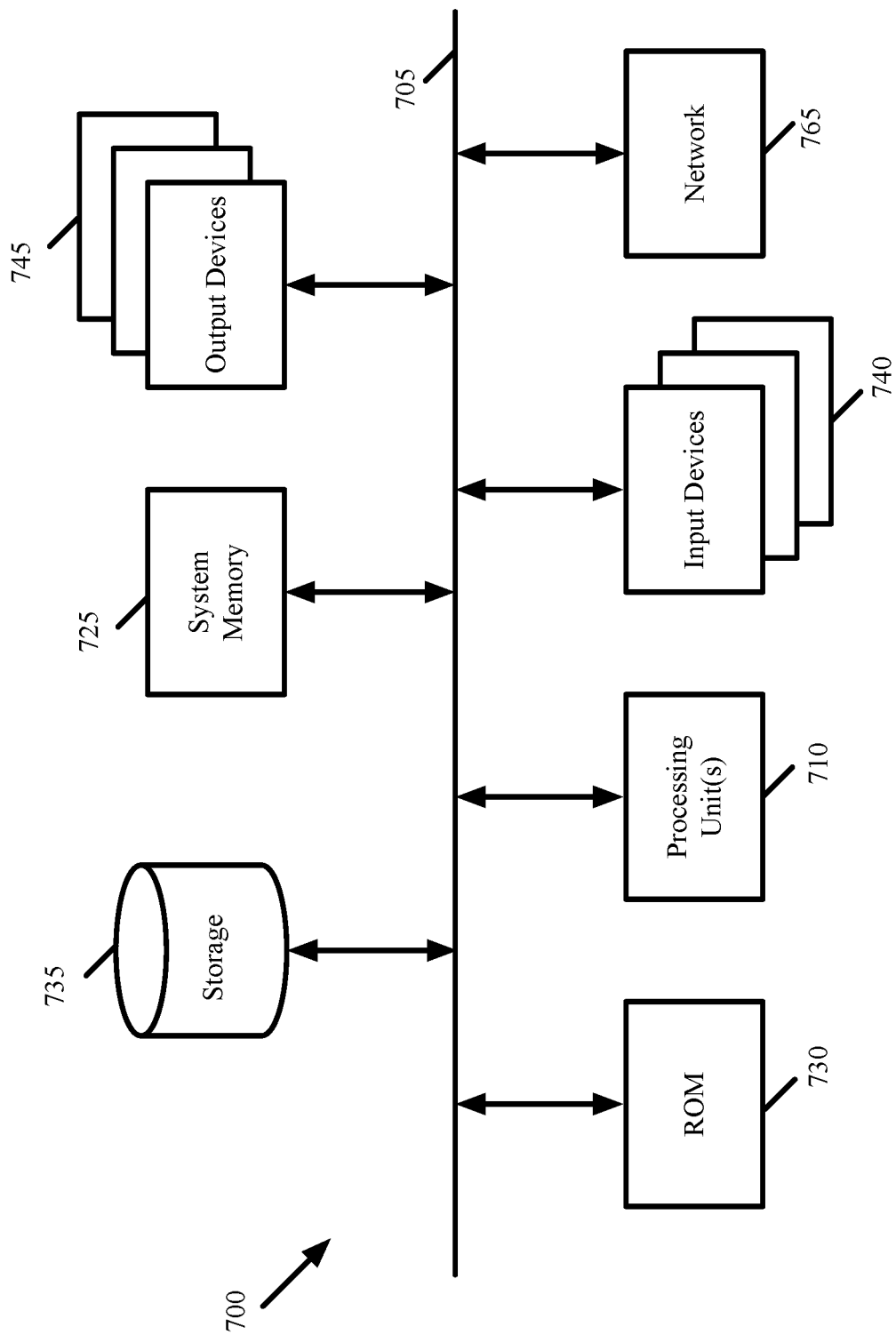
FIG. 7 conceptually illustrates a computer system with which some embodiments of the invention are implemented.

FIG. 7 conceptually illustrates a computer system 700 with which some embodiments of the invention are implemented. The computer system 700 can be used to implement any of the above-described hosts, controllers, gateway and edge forwarding elements. As such, it can be used to execute any of the above-described processes. This computer system 700 includes various types of non-transitory machine-readable media and interfaces for various other types of machine-readable media. Computer system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage device 735, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device 735. Like the permanent storage device 735, the system memory 725 is a read-and-write memory device. However, unlike storage device 735, the system memory 725 is a volatile read-and-write memory, such as random access memory. The system memory 725 stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices 740 enable the user to communicate information and select commands to the computer system 700. The input devices 740 include alphanumeric keyboards and pointing devices (also called "cursor control devices"). The output devices 745 display images generated by the computer system 700. The output devices 745 include printers and display devices, such as cathode ray tubes (CRT) or liquid crystal displays (LCD). Some embodiments include devices such as touchscreens that function as both input and output devices 740 and 745.

Finally, as shown in FIG. 7, bus 705 also couples computer system 700 to a network 765 through a network adapter (not shown). In this manner, the computer 700 can be a part of a network of computers (such as a local area network ("LAN"), a wide area network ("WAN"), or an Intranet), or a network of networks (such as the Internet). Any or all components of computer system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third-party's private cloud datacenters (e.g., datacenters that the third-party uses to deploy cloud gateways for different entities in order to deploy virtual networks for these entities). Thus, one of ordinary skill in the art would understand that the invention is not to be limited by the foregoing illustrative details, but rather is to be defined by the appended claims.

The invention claimed is:

1. A method of allocating a secondary network interface for a pod with a primary network interface, the method comprising:
   receiving a network attachment definition (ND) that designates a first network segment;
   receiving a definition of the pod that is being deployed, the pod having the primary network interface passing telecommunication network data and connected to a second network segment of a telecommunication network;
   determining that the pod definition includes an identifier of the ND;
   creating a secondary network interface for the pod based on the determination that the pod definition includes the identifier of the ND; and
   connecting the secondary network interface to the first network segment, said secondary network interface serving as a high-performance interface for data traffic.

2. The method of claim 1, wherein designating the first network segment comprises identifying a network segment created for a logical network before the ND is received.

3. The method of claim 2 further comprising directing the logical network to modify the network segment according to a set of attributes in the received ND.

4. The method of claim 1, wherein designating the first network segment comprises providing a set of attributes of the first network segment, the method further comprising, directing a controller to create the first network segment according to the provided set of attributes.

5. The method of claim 4, wherein the set of attributes comprises a network type, wherein the network type is a VLAN-backed network segment.

6. The method of claim 4, wherein the set of attributes comprises a network type, wherein the network type is an overlay-backed network segment.

7. A non-transitory machine readable medium storing a program which when executed by at least one processing unit allocates a secondary network interface for a pod with a primary network interface, the program comprising sets of instructions for:
- receiving a network attachment definition (ND) that designates a network segment;
- receiving a definition of the pod that is being deployed, the pod having the primary network interface;
- determining that the pod definition includes an identifier of the ND;
- creating a secondary network interface for the pod based on the determination that the pod definition includes the identifier of the ND; and
- connecting the secondary network interface to the network segment, said secondary network interface serving as a high-performance interface for data traffic.

8. The non-transitory machine readable medium of claim 7, wherein the set of instructions for designating the network segment comprises a set of instructions for identifying the network segment created for a logical network before the ND is received.

9. The non-transitory machine readable medium of claim 8, wherein the program further comprises a set of instructions for directing the logical network to modify the network segment according to a set of attributes in the received ND.

10. The non-transitory machine readable medium of claim 7, wherein the set of instructions for designating the network segment comprises a set of instructions for providing a set of attributes of the network segment, the program further comprising a set of instructions for directing a controller to create the network segment according to the provided set of attributes.

11. The non-transitory machine readable medium of claim 10, wherein the set of attributes comprises a network type, wherein the network type is a VLAN-backed network segment.

12. The non-transitory machine readable medium of claim 10, wherein the set of attributes comprises a network type, wherein the network type is an overlay-backed network segment.

* * * * *